United States Patent [19]
Sugiura

[11] Patent Number: 5,198,838
[45] Date of Patent: Mar. 30, 1993

[54] OPTICAL PICKUP DEVICE WHICH GENERATES A FOCUSING CORRECTION SIGNAL

[75] Inventor: Satoshi Sugiura, Tokorozawa, Japan

[73] Assignee: Pioneer Electronic Corporation, Tokyo, Japan

[21] Appl. No.: 686,083

[22] Filed: Apr. 16, 1991

[30] Foreign Application Priority Data

Jul. 25, 1990 [JP] Japan .................................. 2-196708

[51] Int. Cl.$^5$ .............................................. H04N 1/21
[52] U.S. Cl. ...................................... 346/108; 385/15
[58] Field of Search ..................... 346/108; 385/14, 15, 385/130, 13; 369/44.11, 44.12

[56] References Cited

U.S. PATENT DOCUMENTS 4,672,187  6/1987  Fujita et al. ......................... 250/201
4,885,732 12/1989  Sunagawa et al. ................... 385/130
4,937,808  6/1990  Shimade et al. ..................... 385/130

OTHER PUBLICATIONS

The Transactions of the IEICE, vol. E-73, No. 1, Jan. 1990, "Integration of Detection Optics for Magnetooptical Disk Pickup" Toshiaki Suhara, et al., pp. 110-115.

Primary Examiner—Mark J. Reinhart
Attorney, Agent, or Firm—Sughrue, Mion, Zinn, Macpeak & Seas

[57] ABSTRACT

A pickup device comprises a semiconductor substrate, a light source, a pair of grating elements each having a different coupling condition or having a coupling condition which varies over the length thereof so that an incident angle of a signal light varies. The grating elements are disposed on the semiconductor substrate and a pair of light receiving elements are respectively disposed opposite to the two grating elements for receiving two light beams divided by the grating elements. The grating elements, and thus the pickup device, can be simply and easily formed.

9 Claims, 5 Drawing Sheets

FIG.4A
FIG.4B
FIG.4C
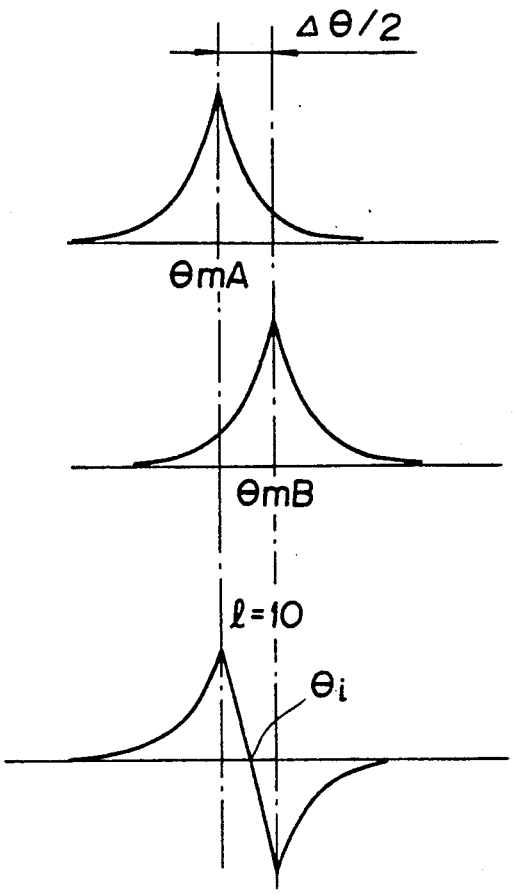
FIG.5
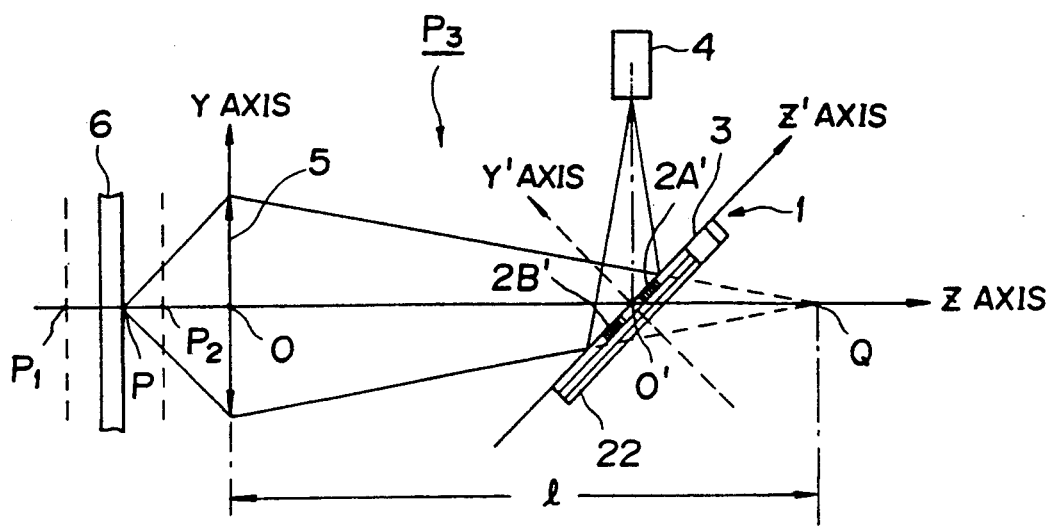

OPTICAL PICKUP DEVICE WHICH GENERATES A FOCUSING CORRECTION SIGNAL

BACKGROUND OF THE INVENTION

This invention relates to an optical pickup for optically reproducing information recorded on a recording medium or for optically recording information onto the recording medium, and more particularly to a pickup for reproducing information recorded on an optical disk used for a compact disk (CD) player, a lazer vision disk (LVD) player or the like.

As a conventional optical pickup, there has appeared an integrated-optic disk pickup (IODPU) lately which comprises a semiconductor laser for emitting a laser beam, located on one side of a semiconductor substrate, an optical condensing grating coupler for diffracting the laser beam, located on the other side thereof to irradiate an information recording surface of the optical disk with the laser beam, and a beam splitter for splitting a beam reflected from the information recording surface into two beams to guide them toward two photodiodes, respectively.

In the above conventional pickup, the optical condensing grating coupler must function to diffract the beam emitted from the semiconductor laser to condense it concisely onto a specified point on the disk. Accordingly, the structure of the condensing grating coupler is complicated so as to achieve the required position.

SUMMARY OF THE INVENTION

It is an object of this invention to provide an optical pickup device which can be simply and easily manufactured and which can precisely detect an information signal.

According to the present invention, there is provided a pickup device for reproducing information recorded on a recording medium and for recording information thereonto, which comprises a semiconductor substrate disposed opposite to the recording medium through an objective lens and having an optical waveguide thereon, a coupling means is disposed adjacent to the optical waveguide of the semiconductor substrate. The coupling means has a pair of grating elements each having a different coupling condition between incident mode and guided mode for separating an incident light into two beams to be guided into the optical waveguide. A pair of light receiving elements are disposed on the semiconductor substrate for respectively receiving the two beams separated by the coupling means and for outputting a signal, and a light source is provided for emitting light onto two surfaces of the semiconductor substrate and the recording medium.

According to the present invention, there is also provided a pickup device for reproducing information recorded on a recording medium and for recording information thereonto, which comprises, a semiconductor substrate disposed opposite to the recording medium through an objective lens and having an optical waveguide thereon. A coupling means is disposed adjacent to the optical waveguide of the semiconductor substrate. The coupling means has a pair of grating elements each of which has a certain length within which an incident angle of a signal light reflected from the medium varies. A pair of light receiving elements are disposed on the semiconductor substrate for respectively receiving the two beams guided by the coupling means and outputting a signal, and a light is provided for emitting light onto the semiconductor substrate and the recording medium.

Further objects, features and other aspects of this invention will be understood from the following detailed description of the preferred embodiments of this invention with reference to the drawings.

BRIEF DESCRIPTION OF THE DRAWINGS

In the accompanying drawings:

FIGS. 4A, 4B and 4C show three waveform diagrams outputted from two photodiodes in which FIG. 4A is a waveform diagram outputted from a first photodiode, FIG. 4B is a waveform diagram outputted from a second photodiode and FIG. 4C is a waveform diagram showing a focus error signal;

FIG. 5 is a side view of a pickup showing another embodiment of this invention;

FIGS. 7A, 7B and 7C show three explanatory views in which FIGS. 7A and 7C are two incident beam views showing two types in a defocused state, respectively, and FIG. 7B is an incident beam view in a focused state;

DETAILED DESCRIPTION OF THE INVENTION

As conductive to a full understanding of the nature and utility of the present invention, a brief consideration of a typical conventional pickup will be first presented below with reference to FIG. 10 principally for the purpose of comparison therebetween.

Figure 10:
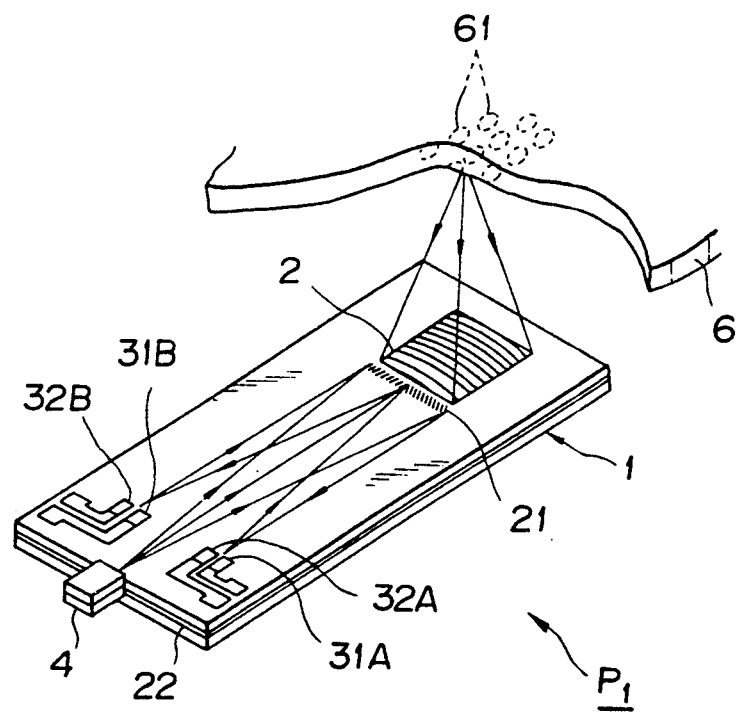
FIG. 10 is a structural view of a conventional pickup.

In FIG. 10, a conventional pickup P1 comprises a semiconductor substrate 1 on one side of which a semiconductor laser 4 is disposed and on the other side of which an optical condensing grating coupler 2 is disposed. The substrate 1 has an optical waveguide layer 22 therein through which a laser beam emitted from the semiconductor laser 4 is divergently guided to the light condensing grating coupler 2 for condensing the laser beam onto an information recording surface 61 of an optical disk 6 through its diffraction function. A signal light diffracted once by the coupler 2 and reflected from the surface 61 of the disk 6 is again diffracted by the grating coupler 2 to direct it to a beam splitter 21 disposed adjacent to the coupler 2, which separates the wave surface of the signal light into two beams through its diffraction function. The separated two beams are condensed to be incident on two pairs of photodiodes 31A, 32A: 31B, 32B which output a detected signal. The detected signal is processed by an electric circuit (not shown) to operate or calculate a focusing error or a tracking error on the basis of Push Pull method, Foucault method and the like.

The condensing grating coupler 2 must function to precisely condense and focus the beam guided by the waveguide layer 22 onto the surface 61 of the optical disk 6. Therefore, the coupler 2 is formed so as to have a grating constant and a grating depth (depth of grooves) varying gradually from position to position on the surface of the coupler 2. Further, the grating thereof must be precisely curved to focus the beam onto a specified position of the optical disk 6. This not only complicates the structure of the coupler 2 but also requires a special process. As a result, it is difficult to manufacture it. In addition, the coupler 2 must be manufactured very precisely, and there may be a difference between a designed value, such as the grating constant or grating depth, and an actual value when the coupler 2 is actually manufactured thereby causing a deviation of the condensing position of the beam from a predetermined position and a variance in a coupling condition. Therefore, precise signal detection cannot be performed.

In order to eliminate these defects, this invention is provided.

Figure 9:
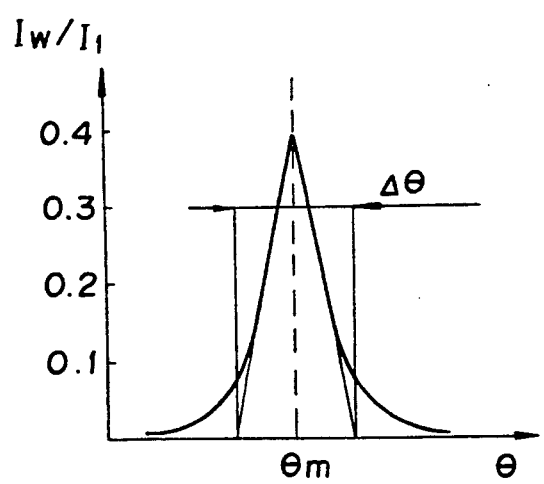
FIG. 9 is a characteristic view showing a relationship between an optimum incident angle and amount of light guided by a waveguide.

This invention will now be explained with reference to FIGS. 1 to 9. This invention utilizes a waveguide optical pumping phenomenon which will be firstly explained with reference to FIGS. 8 and 9. If a diffraction grating formed on an optical waveguide layer 22 satisfies a coupling condition, incident mode $I_1$ couples with guided or trapped mode $I_w$ thereby to function as a grating coupler. The coupling condition includes a refractive index n of each layer in a semiconductor substrate, a thickness t of an optical waveguide layer 22, an incident angle $\theta$, a grating constant d of the diffraction grating 2, polarized light mode and the like. Each condition is so determined that the amount of light guided by the waveguide layer 22 becomes a maximum when an incident angle $\theta$ is the optimum incident angle $\theta_m$. A characteristic property with respect to amount of guided light $I_w/I_1$ at the optimum incident angle $\theta_m$ is shown in FIG. 9. A range $\Delta\theta$ of the incident angle within which mode coupling occurs is extremely small with respect to the incident angle $\theta_m$. A phase matching condition is determined by the following equation (Optical Integrated Circuit by HIROSHI NISHIHARA etc.).

$$n_c k_o \sin \theta = n_{\mathit{eff}} k_o + qk \qquad \text{equation (1)}$$

wherein,
$n_c$: refractive index of air
$k_o = 2\pi/\lambda$ ($\lambda$: wavelength)
$\theta$: incident angle
$n_{\mathit{eff}}$: effective refractive index of optical waveguide
q: order of diffraction
$k = 2\pi/d$ (d: diffraction constant).

On the basis of this equation, the optimum incident angle $\theta_m$ is determined under a certain condition. Further, even if the incident angle $\theta$ changes by a small angle from the optimum incident angle $\theta_m$, the amount of guided light $I_w/I_1$ changes extremely sharply. Since this sharp change of amount of guided light $I_w/I_1$ can be precisely detected, a deviation of an incident angle from the optimum incident angle can be detected as a focusing error. Further, various and flexible design and manufacturing of a pickup device can be realized by determining each parameter in the phase matching condition equation of the above mode.

FIRST EMBODIMENT

Figure 1:
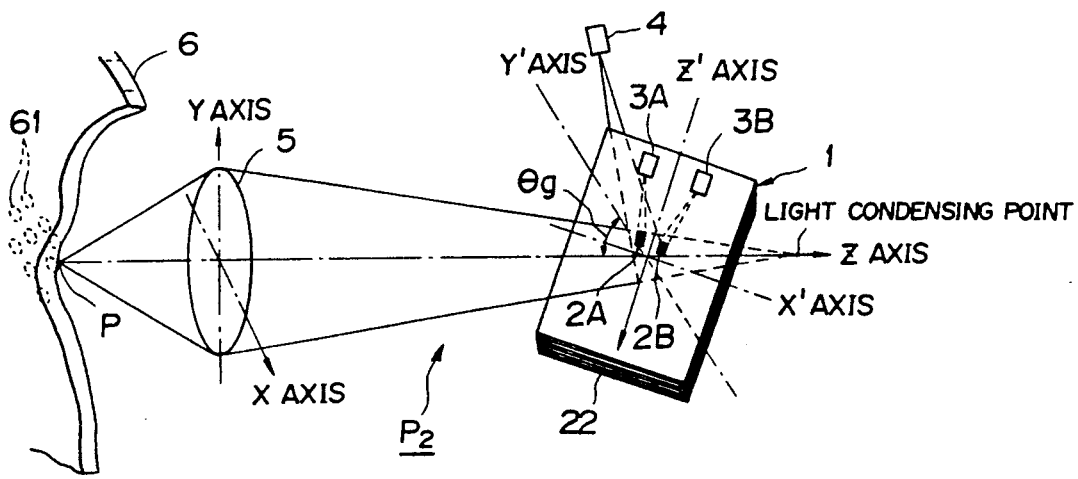
FIG. 1 is a perspective view showing a general structure of a pickup according to this invention.

A first embodiment will be explained with reference to FIGS. 1 to 3.

An optical pickup device $P_2$ has a semiconductor substrate 1 disposed opposite to an optical disk 6 through an objective lens 5. The substrate 1 has first and second diffraction gratings 2A, 2B which are disposed symmetrically with respect to a longitudinal axis Z' crossing the optical axis Z of the objective lens 5 and which have two different grating constants, respectively, in order to differentiate the optimum incident angle of the two diffraction gratings 2A, 2B from each other on the basis of equation (1). Further, first and a second photodiodes 3A, 3B are disposed symmetrically with respect to the axis Z' on the substrate 1 in the guided direction in which a signal beam is directed by a diffraction function of the first and second diffraction gratings 2A, 2B. At a position separated from the semiconductor substrate 1 is provided a semiconductor laser 4 for emitting a laser beam to the upper surface of the substrate 1 from which the laser beam is reflected to irradiate the recording surface of the optical disk 6 therewith.

The objective lens 5 has a front and a rear condensing points P, Q on the optical axis Z, and the semiconductor substrate 1 is provided between the objective lens 5 and the rear condensing point Q so as to form an angle $\theta_g$ between the optical axis Z and an axis Y' perpendicular to the surface of the semiconductor substrate 1.

The grating constants $d_A$, $d_B$ of the first and second diffraction gratings 2A, 2B are determined in such a manner that the difference between two optimum incident angles $\theta_{mA}$, $\theta_{mB}$ of the first and second diffraction gratings 2A, 2B is $\theta_{mA} - \theta_{mB} = \Delta\theta/2$. This range $\Delta\theta/2$ is a proper range to detect a focusing error as mentioned below.

The operation of the optical pickup will now be explained.

Figure 2:
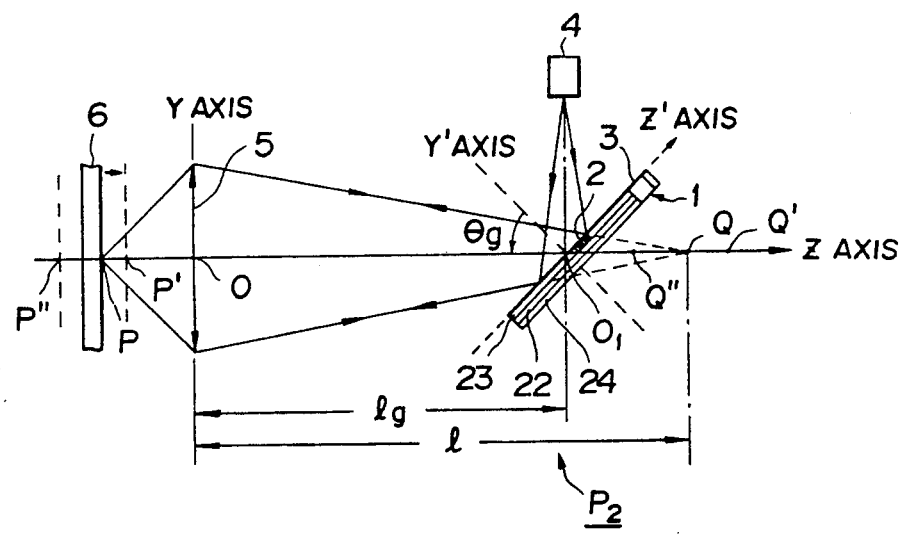
FIG. 2 is a side view of the pickup shown in FIG. 1.
Figure 3:
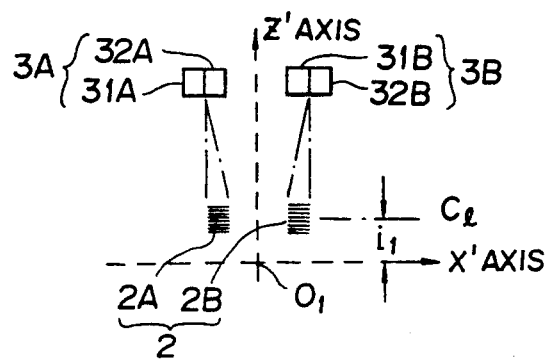
FIG. 3 is a plan view of a semiconductor substrate as viewed along an axis Y' in FIG. 2.

First, in case that the optical disk 6 shown in FIG. 2 is moved from a position (a front condensing point P) indicated by a solid line to a position (a front position P') indicated by a dotted line, a rear condensing point of the objective lens 5 is moved from a point Q to a point Q'. In contrast, in case that the optical disk 6 takes a position P'', a rear condensing point takes a position Q''. At this time, each incident angle of signal light which is reflected from the disk 6 and incident on the first and second diffraction gratings 2A, 2B is changed from each incident angle at the time when the optical system is in focus. The change of the incident angle decreases one of amounts of guided lights $(I_w/I_1)_A$, $(I_w/I_1)_B$ outputted from the first and second diffraction gratings while increasing the other of those amounts, and two separate guided beams are supplied to the corresponding first and second photodiodes 3A, 3B, respectively. A focus error can be detected by obtaining the difference between the two outputs from the first and second photodiodes 3A, 3B.

The outputs of both photodiodes 3A, 3B are shown in FIGS. 4A, 4B. The difference output is calculated by an operating machine and outputted as a focus error signal shown in FIG. 4C. That is, as mentioned above, the first diffraction grating 2A is designed so as to have an optimum incident angle $\theta_{mA}$ while the second diffraction grating 2B is designed so as to have an optimum incident angle $\theta_{mB}$. Further, the difference between the two optimum incident angles $\theta_{mA}$, $\theta_{mB}$ is determined at $\Delta\theta/2$ so as to be properly capable of obtaining a difference output therebetween. When the optical system is in focus, the difference output between the two gratings 2A, 2B becomes zero (point Q2 of FIG. 4C. A deviation of each incident angle can be detected as a focus error by obtaining the difference output therebetween. In this embodiment, the two gratings 2A, 2B are disposed symmetrically with respect to the axis Z' and at the same height position with respect to a horizontal axis X' (FIG. 3).

Furthermore, the operation of the pickup will now be explained with reference to specific numerical values determined as one example.

Suppose that the focal length of the objective lens 5 is f=2.5 mm, and the magnification thereof is $\beta=3$, and a range within which the objective lens 5 can perform a focusing control is PP=10 μm.

At this time, if the front condensing point P is moved by 5 μm, the rear condensing point Q is changed by ±0.09 mm with respect to an image point distance l=10 mm.

The diffraction gratings 2A, 2B are disposed at respective positions where the change of the incident angle is equal to $\theta = \Delta\theta/2$ when the disk 6 is moved by ±5 μm, that is, at respective position where the distance between the axis X' and the center line $C_I$ of each of diffraction gratings 2A, 2B is i$_1$=0.01 mm, the distance between the center O of the objective lens 5 and the crossing point O$_1$ of the axes X' and Z' is lg=9 mm, and the angle between the axis Z' and the axis Y' is $\theta g$=45°. Therefore, in three dimensional coordinates (x, y, z) in which an optical axis is Z, an axis perpendicular to the optical axis Z on the paper surface is Y and an axis perpendicular to the axes Z and Y is X, the first diffraction grating 2A is disposed at a position (−0.01, 9.007, 0.007) while the second diffraction grating 2B is disposed at a position (0.01, 9.007, 0.007). Each of first and second photodiodes 3A, 3B is disposed at a position, on the semiconductor substrate 1, where signal light is guided and condensed by the diffraction function of each of the first and second diffraction gratings 2A, 2B.

When the rear condensing point Q of the signal light of the objective lens 5 is separated by 10 mm (l=10 mm) from the center of the objective lens 5, each incident angle of the first and second diffraction gratings is $\theta$=0.401°. The optimum incident angles $\theta_{mA}$, $\theta_{mB}$ of the first and second diffraction gratings 2A, 2B are as follows.

$\theta_{mA} = 45 - 0.401 - 0.15/4 = 44.562°$ $\theta_{mB} = 45 - 0.401 + 0.15/4 = 44.637°$ wherein the value 0.15 corresponding to $\Delta\theta$.

When the refractive index of the clad layer 23 is n$_c$=1.38, the refractive index of the light waveguide layer 22 is n$_f$=1.51, the refractive index of a core layer is n$_s$=1.46, the effective thickness of the light waveguide layer 22 is t=1 μm, and the waveguide of the light signal is $\lambda_o$=0.785, the two grating constants d$_A$, d$_B$ are as follows.

dA = 0.9971 μm dB = 0.9983 μm.

As mentioned above, the two grating constants d$_A$, d$_B$ are determined as parameters on the basis of the optimum incident angles $\theta_{mA}$, $\theta_{mB}$ of the first and second diffraction gratings 2A, 2B.

SECOND EMBODIMENT

Figure 6:
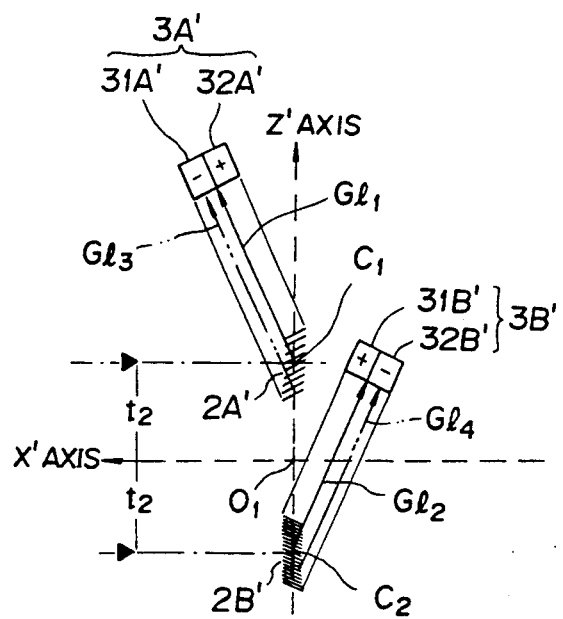
FIG. 6 is a plan view of a semiconductor substrate as viewed along an axis Y' in FIG. 5.

A second embodiment of this invention will now be explained with reference to FIGS. 5 to 7.

This embodiment is effectively adapted for a case where the oscillation wavelength of the semiconductor laser is changed due to a change of temperature and the like.

A pickup P$_3$ has a pair of first and second diffraction gratings 2A', 2B' disposed symmetrically with respect to the axis X' perpendicular to the axis Z' and having either different or the same grating constants. Each grating element has a plurality of gratings extending obliquely in the directions opposite to each other. First and second photodiodes 3A', 3B' are disposed, on opposite sides with respect to the axis Z', in the wave guided direction in which the signal light is diffracted and directed by the first and second diffraction gratings 2A', 2B', respectively. The photodiodes 3A', 3B' have two pairs of elements 31A', 32A'; 31B', 32B', respectively. The centers C$_1$, C$_2$ of the two gratings are equally separated by a distance t2 from the axis X'. Each of gratings has a certain length in the direction of the axis Z', within which an incident angle varies. That is, each grating is extended in the direction where the substrate 1 is inclined. The laser beam from the semiconductor laser 4 is reflected on the upper surface of the semiconductor substrate 1 to irradiate the optical disk 6 therewith.

The operation of the second embodiment will now be explained.

In case that the oscillation wavelength of the semiconductor laser is changed due to a change of eveness of its solid body and a change of temperature, the wavelength of the signal light is changed by ±0.008 μm in the condition that the changing wavelength is Δλ=3 Å/deg, the change of temperature is ±25 deg, and the wavelength of the signal light is λ=0.785 μm.

In consideration of the above change of wavelength, the effective refractive indexes n$_{eff}$ of mode are as follows.

The effective refractive index of a wavelength 0.785 μm is n$_{eff}$(785)=1.48897.

The effective refractive index of a wavelength 0.793 μm is n$_{eff}$(793)=1.48873.

Four optimum incident angles $\theta_{mA}$ (785), $\theta_{mB}$ (785); $\theta_{mA}$ (793), $\theta_{mB}$ (793) with respect to the two effective refractive indexes n$_{eff}$(785), n$_{eff}$(793) are as follows.

The optimum incident angle of the first diffraction grating 2A is $\theta_{mA}$ (785)=44.562°.

The optimum incident angle of the second diffraction grating 2B is $\theta_{mB}$ (785)=44.637°.

The optimum incident angle of the first diffraction grating 2A is $\theta_{mA}$ (793)=43.941°.

The optimum incident angle of the second diffraction grating 2B is $\theta_{mB}$ (793)=44.016°.

As mentioned above, the optimum incident angles $\theta_{mA}$, $\theta_{mB}$ of the first and second diffraction gratings 2A, 2B are determined on the basis of the above equation (1), respectively.

Further, for example, suppose that two incident angles of two light beams which are incident on the center positions C$_1$, C$_2$ of the first and second gratings 2A', 2B' are the optimum incident angles, respectively, under the condition that a wavelength of a signal light is 0.785 μm when the optical system is in focus. At this time, a signal light guided by the grating 2A', along a line G$_{I1}$, to the center between the two elements 31A' 32A'.

A signal light guided by the grating 2B' is directed, along a line $G_{l2}$, to the center between the two elements 31B', 32B'. Therefore, the outputs of the two gratings 2A', 2B' are zero, respectively. If the wavelength of the signal light becomes longer than the determined value $\lambda = 0.785$ μm, the optimum incident angle becomes smaller. Accordingly, the positions of the optimum incident angle on the two gratings 2A', 2B' are shifted downwardly in FIG. 6. The signal light guided by the first grating 2A' is deviated, along a line $G_{l3}$, to the side of the minus element 31A' to output a negative value corresponding to the difference output between the minus element 31A' and the plus element 32A'. In addition, the signal light guided by the second grating 2B' is deviated, along a line $G_{l4}$, to the side of the minus element 31B' to output a negative value corresponding to the difference output between the plus element 31B' and the minus element 32B'. Therefore, the difference output between the first and second photodiodes 3A', 3B' is obtained to be zero. That is, even if the wavelength of the signal light is changed, the change of the wavelength can be compensated for by obtaining the difference output between the first and second photodiodes 3A', 3B'. Accordingly, when the wavelength of the signal light is changed from the determined value, a focus offset occurs. That is, a diffraction grating adapted for a wavelength $\lambda = 0.785$ μm of a signal light also generates a focus offset when a light emitting source (semiconductor laser) having a wavelength different from 0.785 μm is used.

Figures 7A, 7B, 7C:
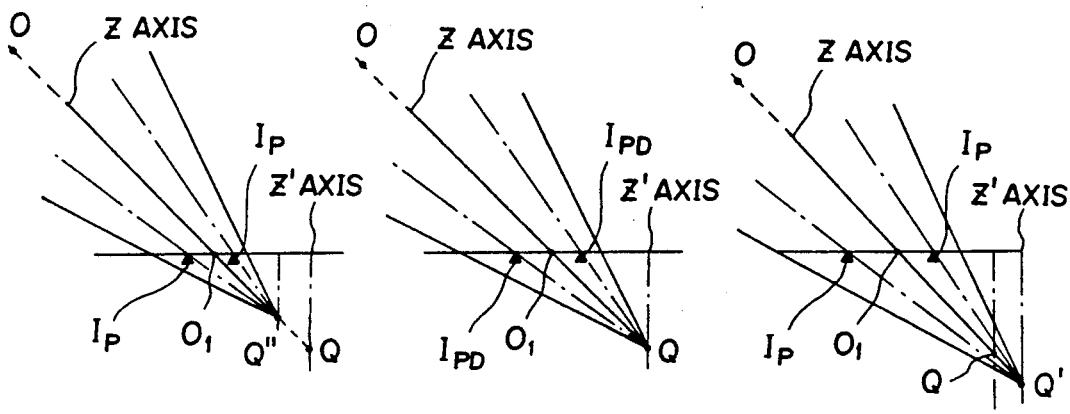
Figure 8:
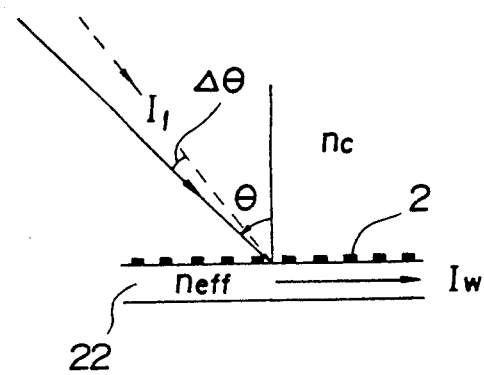
FIG. 8 is an explanatory view showing a state of coupling condition of an optical waveguide layer having a diffraction grating.

In more detail, as shown in FIGS. 7A, 7B and 7C, when a signal light is incident on the first and second diffraction gratings 2A', 2B' so as to be converged at a converging point, two incident beams at the optimum incident angles, which satisfy the mode coupling condition are only changed into guided light by the waveguide layer 22. A change of a position on each of diffraction gratings 2A', 2B' where a signal light having been changed into guided light results in an output difference between the plus and minus elements of each grating as mentioned above. A focus error signal is obtained on the basis of the output of each of photodiodes 3A', 3B'. As shown in FIG. 7A, if two optimum incident points $I_P$, $I_P$ are moved toward the optical axis Z from two determined points $I_{PD}$, $I_{PD}$ of FIG. 7B when the optical system is in focus, an image point distance (distance between the center O of the objective lens and an image point Q) becomes shorter. As a result, the output of the first diffraction grating 2A' becomes a positive value while the output of the second diffraction grating 2B' becomes a negative value thereby to output a focus error signal indicating that the distance between the disk 6 and the objective lens 5 is larger than normal (the distance when the optical system is in focus). When each of the two incident points $I_{PD}$ is, as shown in FIG. 7B, located at a predetermined position, the optical system is in focus.

As shown in FIG. 7C, when each of the two incident points $I_P$ is moved away from the optical axis Z, the output of the first diffraction grating 2A' becomes a positive value while the output of the second diffraction grating 2B' becomes a negative value thereby to output a focus error signal indicating that the objective lens 5 is positioned at a position nearer than normal.

As shown in FIG. 7, when the wavelength of the signal light is changed as well as when the optical system is out of focus, if the difference output between the outputs of the two photodiodes 3A', 3B' is obtained, a focus error signal can be obtained in a state wherein the focus offset is compensated for.

In more detail, as mentioned above, when the wavelength of a signal light is changed, each of the signal beams on the photodiodes 3A', 3B' is moved in the same direction. That is, e.g., when the wavelength of the signal light becomes shorter, a made coupling of each diffraction gratings 2A', 2B' occurs at a large incident angle $\theta$ to output two positive values from the first and second photodiodes 3A', 3B', respectively. Further, when the wavelength of the signal light becomes longer, the mode coupling of each diffraction gratings 2A', 2B' occurs at a small incident angle $\theta$ to output two negative values from the first and second photodiodes 3A', 3B', respectively. Therefore, if a difference between the outputs of the first and second photodiodes 3A', 3B' is obtained, the movement of the signal beam on the first and second photodiodes 3A', 3B' due to the change of the wavelength of the signal light is compensated for. Thus, a compensated focus error signal can be correctly obtained.

Other Embodiments

In the above embodiments, the grating constants $d_A$, $d_B$ of the first and second diffraction gratings 2A, 2B are different from each other, other parameters in the phase matching condition equation (1), e.g., the thicknesses t of two portions on which the first and second diffraction gratings 2A, 2B are formed may be different from each other. That is, since the effective refractive index $n_{eff}$ of the above equation (1) depends on the effective thickness t of the optical guidewave layer 22, the effective thickness t may be a parameter. For example, if the thickness tA of the optical waveguide layer 22 of the first diffraction grating 2A is determined at 1 μm while the thickness tB the light waveguide layer 22 of the second diffraction grating 2B is determined at 1.04 μm, a focus error signal can be obtained even if the grating constant of the first and second diffraction gratings 2A, 2B are determined at the same value.

Moreover, in the above embodiments, the semiconductor substrate having the first and second diffraction gratings 2A, 2B and the first and second photodiodes 3A, 3B is disposed between the objective lens 5 and the rear focus point Q, and, however, it may be disposed outside of the rear focus point Q.

According to this invention, a coupling means is formed with two grating elements having two different coupling conditions between the incident mode and waveguide mode, which are disposed opposite to each other on the semiconductor substrate through an objective lens and an incident light is divided into two beams to be guided in an optical waveguide. The coupling means may be disposed to have a certain length in the direction where the incident angle of the signal light varies. Therefore, coupling means can be incorporated into an optical pickup which is easily manufactured. Moreover, the simple coupling means can be readily manufactured in conformity with a design value to obtain a desired signal detection.

What is claimed is:

1. An optical pickup device for reproducing information recorded on a recording medium and recording information thereonto, which comprises:
   a) a semiconductor substrate disposed opposite to the recording medium through an objective lens and having an optical waveguide thereon;

b) coupling means disposed adjacent to the optical waveguide of the semiconductor substrate and comprising first and second grating elements having first and second coupling conditions, respectively, for guiding a light signal reflected from the recording medium into the optical waveguide, said first and second coupling conditions being prescribed such that a first optimum incident angle of said first grating element is different from a second optimum incident angle of said second grating element;

c) first and second light receiving elements disposed on the semiconductor substrate for respectively receiving beams of light, which are guided by said first and second grating elements and for outputting a signal in response thereto; and d) a light source for emitting light onto the semiconductor substrate and and the recording medium.

2. An optical pickup device according to claim 1, wherein the semiconductor substrate is disposed obliquely with respect to an optical axis between the light source and the recording medium.

3. An optical pickup device according to claim 1, wherein said first and second grating elements are disposed at two respective positions which are located at the same height position with respect to the optical axis.

4. An optical pickup device according to claim 2, wherein said first optimum incident angle is different by $\Delta\theta/2$ from said second optimum incident angle wherein $\Delta\theta$ is a range of incident angles within which mode coupling occurs in said first and second grating elements, and output difference between said first and second light receiving elements being obtained to output a focus error signal.

5. An optical pickup device according to claim 1, wherein said first and second grating elements have different grating constants with respect to each other.

6. An optical pickup device according to claim 1, wherein thicknesses of a first optical waveguide portion which is adjacent to said first grating element and second optical waveguide portion which is adjacent to said second grating element are different from each other to make said first coupling condition different from said second coupling condition.

7. An optical pickup device for reproducing information recorded on a recording medium and recording information thereonto, which comprises:

a) a semiconductor substrate disposed opposite to the recording medium through an objective lens and having an optical waveguide thereon;

b) a coupling means disposed adjacent to the optical waveguide of the semiconductor substrate and comprising first and second grating elements each of which has a certain length in such a direction that an incident angle of a light signal, which is reflected from the recording medium and covered by said objective lens, varies along said direction;

c) first and second light receiving elements disposed on the semiconductor substrate for respectively receiving beams of light guided by said first and second grating elements and for outputting a signal in response thereto; and d) a light source for emitting light onto the semiconductor substrate and the recording medium.

8. An optical pickup device according to claim 7, wherein said first and second grating elements are disposed separately in an inclined direction of the semiconductor substrate, each of said first and second grating elements having a plurality of gratings extending obliquely in directions opposite to each other.

9. An optical pickup device according to claim 7, wherein an output different between said first and second light receiving elements is obtained to compensate for a change of wavelength of the light emitted from said light source.

* * * * *